(12) United States Patent
Choudhary et al.

(10) Patent No.: US 11,537,716 B1
(45) Date of Patent: Dec. 27, 2022

(54) METHODS FOR DETECTING CHANGES TO A FIRMWARE AND DEVICES THEREOF

(71) Applicant: F5 Networks, Inc., Seattle, WA (US)

(72) Inventors: Sanjay Choudhary, Fremont, CA (US); Jason Thomas Shriver, Greenacres, WA (US); John Morris Hall, Seattle, WA (US)

(73) Assignee: F5, Inc., Seattle, WA (US)

( * ) Notice: Subject to any disclaimer, the term of this patent is extended or adjusted under 35 U.S.C. 154(b) by 315 days.

(21) Appl. No.: 16/682,281

(22) Filed: Nov. 13, 2019

Related U.S. Application Data

(60) Provisional application No. 62/760,331, filed on Nov. 13, 2018.

(51) Int. Cl.
*G06F 21/57* (2013.01)
*H04L 9/40* (2022.01)
*H04L 9/06* (2006.01)

(52) U.S. Cl.
CPC .......... *G06F 21/572* (2013.01); *H04L 9/0643* (2013.01); *H04L 63/1416* (2013.01); *H04L 63/1425* (2013.01); *G06F 2221/033* (2013.01)

(58) Field of Classification Search
CPC ............. G06F 21/572; G06F 2221/033; H04L 9/0643; H04L 63/1416; H04L 63/1425
See application file for complete search history.

(56) References Cited

U.S. PATENT DOCUMENTS

| 1,286,369 A | 12/1918 | McCourt |
| 2,936,141 A | 5/1960 | Rapata |
| 4,568,243 A | 2/1986 | Schubert et al. |

(Continued)

FOREIGN PATENT DOCUMENTS

| EP | 1813084 A1 | 8/2007 | |
| GB | 2430055 A * | 3/2007 | ............. G06F 21/51 |

(Continued)

OTHER PUBLICATIONS

Mogul, Jeffrey C., "The Case for Persistent-Connection HTTP," SIGCOMM '95, Digital Equipment Corporation Western Research Laboratory, 1995, pp. 1-15, Cambridge, Maine.

(Continued)

*Primary Examiner* — Noura Zoubair
*Assistant Examiner* — Afaq Ali
(74) *Attorney, Agent, or Firm* — Troutman Pepper Hamilton Sanders LLP (Rochester)

(57) ABSTRACT

Methods, non-transitory computer readable media, network traffic manager apparatuses, and systems that assist with detecting changes to a firmware software components, and configuration parameters includes obtaining an executable file comprising a basic input-output system firmware and software component data of a hardware component at run-time. A hash value for the obtained executable file at the run-time is identified. The identified hash value is compared with a stored hash value associated with the obtained executable file to determine when the obtained executable file is unmodified, wherein the stored hash value was determined at a build time of the hardware component. The obtained executable file of the hardware component is executed when the obtained executable file is determined to be unmodified.

16 Claims, 7 Drawing Sheets

(56) References Cited

U.S. PATENT DOCUMENTS

| | | |
|---|---|---|
| 4,914,650 A | 4/1990 | Sriram |
| 5,388,237 A | 2/1995 | Sodos |
| 5,477,541 A | 12/1995 | White et al. |
| 5,699,361 A | 12/1997 | Ding et al. |
| 5,742,765 A | 4/1998 | Wong et al. |
| 5,761,534 A | 6/1998 | Lundberg et al. |
| 5,797,033 A | 8/1998 | Ecclesine |
| 5,812,867 A | 9/1998 | Basset |
| 5,828,835 A | 10/1998 | Isfeld et al. |
| 5,941,988 A | 8/1999 | Bhagwat et al. |
| 6,026,090 A | 2/2000 | Benson et al. |
| 6,026,443 A | 2/2000 | Oskouy et al. |
| 6,070,219 A | 5/2000 | McAlpine et al. |
| 6,115,802 A | 9/2000 | Tock et al. |
| 6,347,337 B1 | 2/2002 | Shah et al. |
| 6,388,989 B1 | 5/2002 | Malhotra |
| 6,493,770 B1 | 12/2002 | Sartore et al. |
| 6,529,508 B1 | 3/2003 | Li et al. |
| 6,574,220 B1 | 6/2003 | Petty |
| 6,643,748 B1 | 11/2003 | Wieland |
| 6,700,871 B1 | 3/2004 | Harper et al. |
| 6,748,457 B2 | 6/2004 | Fallon et al. |
| 6,781,990 B1 | 8/2004 | Puri et al. |
| 6,785,236 B1 | 8/2004 | Lo et al. |
| 6,820,133 B1 | 11/2004 | Grove et al. |
| 6,904,040 B2 | 6/2005 | Salapura et al. |
| 6,934,776 B2 | 8/2005 | Connor et al. |
| 6,999,457 B2 | 2/2006 | Shinohara |
| 7,046,628 B2 | 5/2006 | Luhmann et al. |
| 7,065,630 B1 | 6/2006 | Ledebohm et al. |
| 7,107,348 B2 | 9/2006 | Shimada et al. |
| 7,117,308 B1 | 10/2006 | Mitten et al. |
| 7,124,196 B2 | 10/2006 | Hooper |
| 7,142,540 B2 | 11/2006 | Hendel et al. |
| 7,164,678 B2 | 1/2007 | Connor |
| 7,174,393 B2 | 2/2007 | Boucher et al. |
| 7,189,053 B2 | 3/2007 | Winkler et al. |
| 7,236,491 B2 | 6/2007 | Tsao et al. |
| 7,272,150 B2 | 9/2007 | Bly et al. |
| 7,281,030 B1 | 10/2007 | Davis |
| 7,324,525 B2 | 1/2008 | Fuhs et al. |
| 7,327,674 B2 | 2/2008 | Eberle et al. |
| 7,349,405 B2 | 3/2008 | Deforche |
| 7,353,326 B2 | 4/2008 | Cho et al. |
| 7,355,977 B1 | 4/2008 | Li |
| 7,376,772 B2 | 5/2008 | Fallon |
| 7,403,542 B1 | 7/2008 | Thompson |
| 7,411,957 B2 | 8/2008 | Stacy et al. |
| 7,415,034 B2 | 8/2008 | Muller et al. |
| 7,420,931 B2 | 9/2008 | Nanda et al. |
| 7,457,313 B2 | 11/2008 | Patrick |
| 7,475,122 B2 | 1/2009 | Azpitarte |
| 7,478,186 B1 | 1/2009 | Onufryk et al. |
| 7,496,689 B2 | 2/2009 | Sharp et al. |
| 7,496,695 B2 | 2/2009 | Go et al. |
| 7,500,028 B2 | 3/2009 | Yamagishi |
| 7,512,078 B2 | 3/2009 | Swain et al. |
| 7,512,721 B1 | 3/2009 | Olson |
| 7,533,197 B2 | 5/2009 | Leonard et al. |
| 7,552,232 B2 | 6/2009 | Helmer, Jr. et al. |
| 7,558,910 B2 | 7/2009 | Alverson et al. |
| 7,571,299 B2 | 8/2009 | Loeb |
| 7,590,753 B2 | 9/2009 | Wolde et al. |
| 7,620,046 B2 | 11/2009 | Ronciak et al. |
| 7,620,071 B2 | 11/2009 | Makineni et al. |
| 7,621,162 B2 | 11/2009 | Bartky |
| 7,647,416 B2 | 1/2010 | Chiang et al. |
| 7,657,659 B1 | 2/2010 | Lambeth et al. |
| 7,660,916 B2 | 2/2010 | Moskalev et al. |
| 7,668,727 B2 | 2/2010 | Mitchell et al. |
| 7,668,851 B2 | 2/2010 | Triplett |
| 7,710,989 B2 | 5/2010 | Chew |
| 7,729,239 B1 | 6/2010 | Aronov et al. |
| 7,734,809 B2 | 6/2010 | Joshi et al. |
| 7,735,099 B1 | 6/2010 | Micalizzi, Jr. |
| 7,742,412 B1 | 6/2010 | Medina |
| 7,748,955 B2 | 7/2010 | Lee |
| 7,784,093 B2 | 8/2010 | Deng et al. |
| 7,813,277 B2 | 10/2010 | Okholm et al. |
| 7,826,487 B1 | 11/2010 | Mukerji et al. |
| 7,840,841 B2 | 11/2010 | Huang et al. |
| 7,877,524 B1 | 1/2011 | Annem et al. |
| 7,885,065 B2 | 2/2011 | Kaneko et al. |
| 7,916,728 B1 | 3/2011 | Mimms |
| 7,929,433 B2 | 4/2011 | Husak et al. |
| 7,936,772 B2 | 5/2011 | Kashyap |
| 7,991,918 B2 | 8/2011 | Jha et al. |
| 7,996,569 B2 | 8/2011 | Aloni et al. |
| 8,006,016 B2 | 8/2011 | Muller et al. |
| 8,077,620 B2 | 12/2011 | Solomon et al. |
| 8,099,528 B2 | 1/2012 | Millet et al. |
| 8,103,809 B1 | 1/2012 | Michels et al. |
| 8,112,491 B1 | 2/2012 | Michels et al. |
| 8,112,594 B2 | 2/2012 | Giacomoni et al. |
| 8,162,595 B2 | 4/2012 | Zwinger et al. |
| 8,233,380 B2 | 7/2012 | Subramanian et al. |
| 8,279,865 B2 | 10/2012 | Giacomoni et al. |
| 8,306,036 B1 | 11/2012 | Bollay |
| 8,325,474 B2 | 12/2012 | Spaulding et al. |
| 8,346,993 B2 | 1/2013 | Michels et al. |
| 8,347,118 B1 | 1/2013 | Wyatt et al. |
| 8,447,884 B1 | 5/2013 | Baumann |
| 8,448,234 B2 | 5/2013 | Mondaeev et al. |
| 8,660,291 B2 | 2/2014 | Wang |
| 8,799,403 B2 | 8/2014 | Chan et al. |
| 8,848,715 B2 | 9/2014 | Izenberg et al. |
| 8,870,528 B2 | 10/2014 | Teramoto et al. |
| 8,880,632 B1 | 11/2014 | Michels |
| 8,880,696 B1 | 11/2014 | Michels |
| 8,971,538 B1* | 3/2015 | Marr .............. G06F 8/65 380/285 |
| 8,984,178 B2 | 3/2015 | Michels et al. |
| 9,032,113 B2 | 5/2015 | Conroy et al. |
| 2001/0038629 A1 | 11/2001 | Shinohara |
| 2002/0156927 A1 | 10/2002 | Boucher et al. |
| 2003/0005301 A1* | 1/2003 | Jutzi .............. H04N 21/4405 713/176 |
| 2003/0033563 A1 | 2/2003 | Cashman et al. |
| 2003/0067930 A1 | 4/2003 | Salapura et al. |
| 2003/0204636 A1 | 10/2003 | Greenblat et al. |
| 2004/0021256 A1 | 2/2004 | DeGrange et al. |
| 2004/0024853 A1 | 2/2004 | Cates et al. |
| 2004/0032830 A1 | 2/2004 | Bly et al. |
| 2004/0062245 A1 | 4/2004 | Sharp et al. |
| 2004/0202161 A1 | 10/2004 | Stachura et al. |
| 2004/0249881 A1 | 12/2004 | Jha et al. |
| 2004/0249948 A1 | 12/2004 | Sethi et al. |
| 2004/0267897 A1 | 12/2004 | Hill et al. |
| 2005/0007991 A1 | 1/2005 | Ton et al. |
| 2005/0083952 A1 | 4/2005 | Swain |
| 2005/0091390 A1 | 4/2005 | Helmer et al. |
| 2005/0114559 A1 | 5/2005 | Miller |
| 2005/0141427 A1 | 6/2005 | Bartky |
| 2005/0160196 A1 | 7/2005 | Dutton et al. |
| 2005/0175014 A1 | 8/2005 | Patrick |
| 2005/0213570 A1 | 9/2005 | Stacy et al. |
| 2005/0226234 A1 | 10/2005 | Sano et al. |
| 2006/0007928 A1 | 1/2006 | Sangillo |
| 2006/0067349 A1 | 3/2006 | Ronciak et al. |
| 2006/0104303 A1 | 5/2006 | Makineni et al. |
| 2006/0221832 A1 | 10/2006 | Muller et al. |
| 2006/0221835 A1 | 10/2006 | Sweeney |
| 2006/0224820 A1 | 10/2006 | Cho et al. |
| 2006/0230451 A1* | 10/2006 | Kramer .............. G06F 21/56 726/22 |
| 2006/0235996 A1 | 10/2006 | Wolde et al. |
| 2006/0288128 A1 | 12/2006 | Moskalev et al. |
| 2007/0162619 A1 | 7/2007 | Aloni et al. |
| 2007/0168495 A1 | 7/2007 | Rothstein et al. |
| 2008/0049622 A1 | 2/2008 | Previdi et al. |
| 2008/0126509 A1 | 5/2008 | Subramanian et al. |
| 2008/0147858 A1 | 6/2008 | Prakash et al. |
| 2008/0152479 A1 | 6/2008 | Horng et al. |
| 2008/0175705 A1 | 7/2008 | Liu |

(56) References Cited

U.S. PATENT DOCUMENTS

| | | | |
|---|---|---|---|
| 2008/0184248 A1 | 7/2008 | Barua et al. | |
| 2008/0201772 A1 | 8/2008 | Mondaeev et al. | |
| 2008/0219279 A1 | 9/2008 | Chew | |
| 2009/0003204 A1 | 1/2009 | Okholm et al. | |
| 2009/0016217 A1 | 1/2009 | Kashyap | |
| 2009/0089619 A1 | 4/2009 | Huang et al. | |
| 2009/0144720 A1 | 6/2009 | Roush et al. | |
| 2009/0154459 A1 | 6/2009 | Husak et al. | |
| 2009/0222598 A1 | 9/2009 | Hayden | |
| 2009/0248911 A1 | 10/2009 | Conroy et al. | |
| 2009/0279559 A1 | 11/2009 | Wong et al. | |
| 2010/0082849 A1 | 4/2010 | Millet et al. | |
| 2010/0085875 A1 | 4/2010 | Solomon et al. | |
| 2010/0094945 A1 | 4/2010 | Chan et al. | |
| 2010/0142136 A1 | 6/2010 | Bougaev et al. | |
| 2010/0251008 A1 | 9/2010 | Swildens | |
| 2011/0060855 A1 | 3/2011 | Kuschke et al. | |
| 2011/0099175 A1* | 4/2011 | Darcy | G06F 16/9014 707/747 |
| 2011/0228781 A1 | 9/2011 | Izenberg et al. | |
| 2012/0191800 A1 | 7/2012 | Michels et al. | |
| 2012/0195738 A1 | 8/2012 | Chan | |
| 2013/0132614 A1 | 5/2013 | Bajpai et al. | |
| 2013/0250777 A1 | 9/2013 | Ziegler | |
| 2013/0309064 A1 | 11/2013 | Liu | |
| 2014/0032695 A1 | 1/2014 | Michels et al. | |
| 2014/0185442 A1 | 7/2014 | Newman et al. | |
| 2014/0301207 A1 | 10/2014 | Durand et al. | |
| 2014/0359239 A1* | 12/2014 | Hiremane | G06F 11/0766 711/163 |
| 2018/0096152 A1* | 4/2018 | Martinez | G06F 21/575 |

FOREIGN PATENT DOCUMENTS

| | | | |
|---|---|---|---|
| KR | 101816022 B1 * | 1/2018 | ............ G06F 21/57 |
| TW | 291103 B | 11/1996 | |
| WO | 2004079930 A2 | 9/2004 | |
| WO | 2006055494 A1 | 5/2006 | |
| WO | 2009158680 A1 | 12/2009 | |
| WO | WO-2011119985 A2 * | 9/2011 | ........... G06F 21/575 |

OTHER PUBLICATIONS

Welch, Von, "A User's Guide to TCP Windows," http://www.vonwelch.com/report/tcpwindows, updated 1996, last accessed Jan. 29, 2010, pp. 1-5.

Gigabit Ethernet/PCI Network Interface Card; Host/NIC Software Interface Definition, Jul. 1999, pp. 1-80, Revision 12.4.13, P/N 020001, Alteon WebSystems, Inc., San Jose, California.

Harvey et al., "DMA Fundamentals on Various PC Platforms," Application Note 011, Apr. 1999, pp. 1-20, National Instruments Corporation.

Bell Laboratories, Lucent Technologies, "Layer 4/7 Switching and Other Custom IP Traffic Processing using the NEPPI API," Bell Laboratories, Lucent Technologies, pp. 1-11, Murray Hill, NJ, 2000.

Stevens, W., "TCP Slow Start, Congestion Avoidance, Fast Retransmit, and Fast Recovery Algorithms," Network Working Group, RFC 2001, Jan. 1997, pp. 1-6.

Wadge, Wallace, "Achieving Gigabit Performance on Programmable Ethernet Network Interface Cards," May 29, 2001, pp. 1-9.

Cavium Networks, "Nitrox XL Security Acceleration Modules PCI 3V or 3V/5V-Universal Boards for SSL and IPSec," at http://www.Caviumnetworks.com, 2002, p. 1, Mountain View, CA USA.

EventHelix, "TCP-Transmission Control Protocol (TCP Fast Retransmit and Recovery)," Mar. 28, 2002, pp. 1-5, EventHelix.com.

Rabinovich et al., "DHTTP: An Efficient and Cache-Friendly Transfer Protocol for the Web," IEEE/ACM Transactions on Networking, Dec. 2004, pp. 1007-1020, vol. 12, No. 6.

Comtech AHA Corporation, "Comtech AHA Announces 3.0 Gbps GZIP Compression/Decompression Accelerator AHA362-PCIX offers high-speed GZIP compression and decompression," www.aha.com, Apr. 20, 2005, pp. 1-2, Moscow, ID, USA.

Chapter 15, Memory Mapping and DMA, Memory Management in Linux, ch15.13676, accessed on Jan. 25, 2005, pp. 412-463.

Comtech AHA Corporation, "Comtech AHA Announces GZIP Compression and Decompression IC Offers the highest speed and compression ratio performance in hardware on the market," www.aha.com, Jun. 26, 2007, pp. 1-2, Moscow, ID, USA.

Mangino, John, "Using DMA with High Performance Peripherals to Maximize System Performance," WW TMS470 Catalog Applications, SPNA105 Jan. 2007, pp. 1-23.

Plan 9 kernel history: overview / file list / diff list,, accessed Oct. 22, 2007, pp. 1-16.

Cavium Networks, "Cavium Networks Product Selector GuideSingle & Multi-Core MIPS Processors, Security Processors and Accelerator Boards," 2008, pp. 1-44.

Cavium Networks, "PCI, PCI-X," at (http://www.cavium.com/accelerationboardsPCIPCI-X.htm (Downloaded Oct. 2008), Cavium NetworksProducts > Acceleration Boards > PCI, PCI-X).

Salchow, Jr., KJ, "Clustered Multiprocessing: Changing the Rules of the Performance Game," F5 White Paper, Jan. 2008, pp. 1-11, F5 Networks, Inc.

Wikipedia, "Nagle's algorithm", 2 pages, Oct. 9, 2009.

EventHelix, "DMA and Interrupt Handling", Jan. 29, 2010, pp. 1-4, EventHelix.com.

Wikipedia, "Direct memory access", accessed Jan. 29, 2010, pp. 1-6.

Keithley et al., "A USB 2.0 Controller for an ARM7TDM-S Processor Implemented in FPGA", 2011, pp. 689-692.

BIG-IP® Local Traffic Manager™: Implementations, Version 13.1, F5 Networks, Inc., (2018).

* cited by examiner

"3b19d75c9f840e85fb7eefbb700e0b280e4394f4c03d7661eac63661de39d2c2",
"9bb72a7ab9a7fa9e5b661ab316c92db8b6215cffe9f53480607965b2241a2025",
"43e16b6170a45e0532a328a9d700175a4fc0f5124b5ea2589b3175bd5d1ab5bcc",
"3d458cfe55cc03ea1f443f1562beec8df51c75e14a9fcf9a7234a13f198e7969",
"3d458cfe55cc03ea1f443f1562beec8df51c75e14a9fcf9a7234a13f198e7969",
"3d458cfe55cc03ea1f443f1562beec8df51c75e14a9fcf9a7234a13f198e7969",
"3d458cfe55cc03ea1f443f1562beec8df51c75e14a9fcf9a7234a13f198e7969",
"b5710bf57a25623e4019027da116821fa99f5c81e9e38b87671cc574f9281439"

FIG. 7

METHODS FOR DETECTING CHANGES TO A FIRMWARE AND DEVICES THEREOF

This application claims the benefit of U.S. Provisional Patent Application Ser. No. 62/760,331, filed Nov. 13, 2018, which is hereby incorporated by reference in its entirety.

FIELD

This technology generally relates to network traffic management, and particularly relates to, methods for detecting changes to a firmware and devices thereof.

BACKGROUND

Security threats affecting computer systems present an ever-evolving challenge. In particular, security threats, such as worms, trojans, and viruses, have been very common and these security threats typically originate as a result from browsing activities on the internet or installation of a software application at a client computing device by a user.

To prevent or reduce attacks on computer systems that occur through security threats, such as worms, trojans, and viruses, through security technologies, such as anti-malware software, installed or executed on the client computing device and periodically updated as new security threats are identified and addressed. Accordingly, these security technologies have only catered to security attacks on computer systems stemming from user activity as discussed above. However, these security technologies fail to identify and address any security threats that originate from non-user activity, such as malware that can be infected into a firmware and/or a software of a hardware component at the time of assembling the computer system. In other words, these security technologies fail to solve the technological problem of detecting security threats that result due to a software component and/or firmware of a hardware device that is initially compromised at the time of manufacturing and assembly of the computer system, let alone preventing such security threats.

SUMMARY

A method comprising obtaining an executable file comprising a basic input-output system firmware and software component data of a hardware component at run-time. A hash value for the obtained executable file at the run-time is identified. The identified hash value is compared with a stored hash value associated with the obtained executable file to determine when the obtained executable file is unmodified, wherein the stored hash value was determined at a build time of the hardware component. The obtained executable file of the hardware component is executed when the obtained executable file is determined to be unmodified.

A non-transitory computer readable medium having stored thereon instructions comprising machine executable code which when executed by at least one processor, causes the processor to obtain an executable file comprising a basic input-output system firmware and software component data of a hardware component at run-time. A hash value for the obtained executable file at the run-time is identified. The identified hash value is compared with a stored hash value associated with the obtained executable file to determine when the obtained executable file is unmodified, wherein the stored hash value was determined at a build time of the hardware component. The obtained executable file of the hardware component is executed when the obtained executable file is determined to be unmodified.

A network traffic manager apparatus including at least one of configurable hardware logic configured to be capable of implementing or a processor coupled to a memory and configured to execute programmed instructions stored in the memory to obtain an executable file comprising a basic input-output system firmware and software component data of a hardware component at run-time. A hash value for the obtained executable file at the run-time is identified. The identified hash value is compared with a stored hash value associated with the obtained executable file to determine when the obtained executable file is unmodified, wherein the stored hash value was determined at a build time of the hardware component. The obtained executable file of the hardware component is executed when the obtained executable file is determined to be unmodified.

A network traffic management system, comprising one or more traffic management apparatuses, client devices, or server devices, the network traffic management system comprising memory comprising programmed instructions stored thereon and one or more processors configured to be capable of executing the stored programmed instructions to obtain an executable file comprising a basic input-output system firmware and software component data of a hardware component at run-time. A hash value for the obtained executable file at the run-time is identified. The identified hash value is compared with a stored hash value associated with the obtained executable file to determine when the obtained executable file is unmodified, wherein the stored hash value was determined at a build time of the hardware component. The obtained executable file of the hardware component is executed when the obtained executable file is determined to be unmodified.

Accordingly, this technology provides methods, non-transitory computer readable medium, and apparatuses that assist with detecting changes to a firmware and software components associated with a hardware component. By using the techniques illustrated below, the disclosed technology is able to solve the technological problem illustrated above in the background section by detect malware that is incorporated into a hardware device at the time of manufacturing. Using the techniques illustrated below, the disclosed technology is able to compare the firmware and/or software of a hardware device that was installed at the time of manufacturing and at the time of execution. Only when the firmware and/or software of a hardware device that was installed at the time of manufacturing matches exactly with the firmware and/or software at the time of execution, the disclosed technology assists with booting the hardware component.

BRIEF DESCRIPTION OF THE DRAWINGS

FIG. 5 is an exemplary image of a basic input-output system (BIOS) firmware of a hardware component;

FIG. 6 is an exemplary image illustrating an executable file including BIOS firmware and a software component; and FIG. 7 is an exemplary image illustrating a set of encrypted hash values.

DETAILED DESCRIPTION

Figure 1:
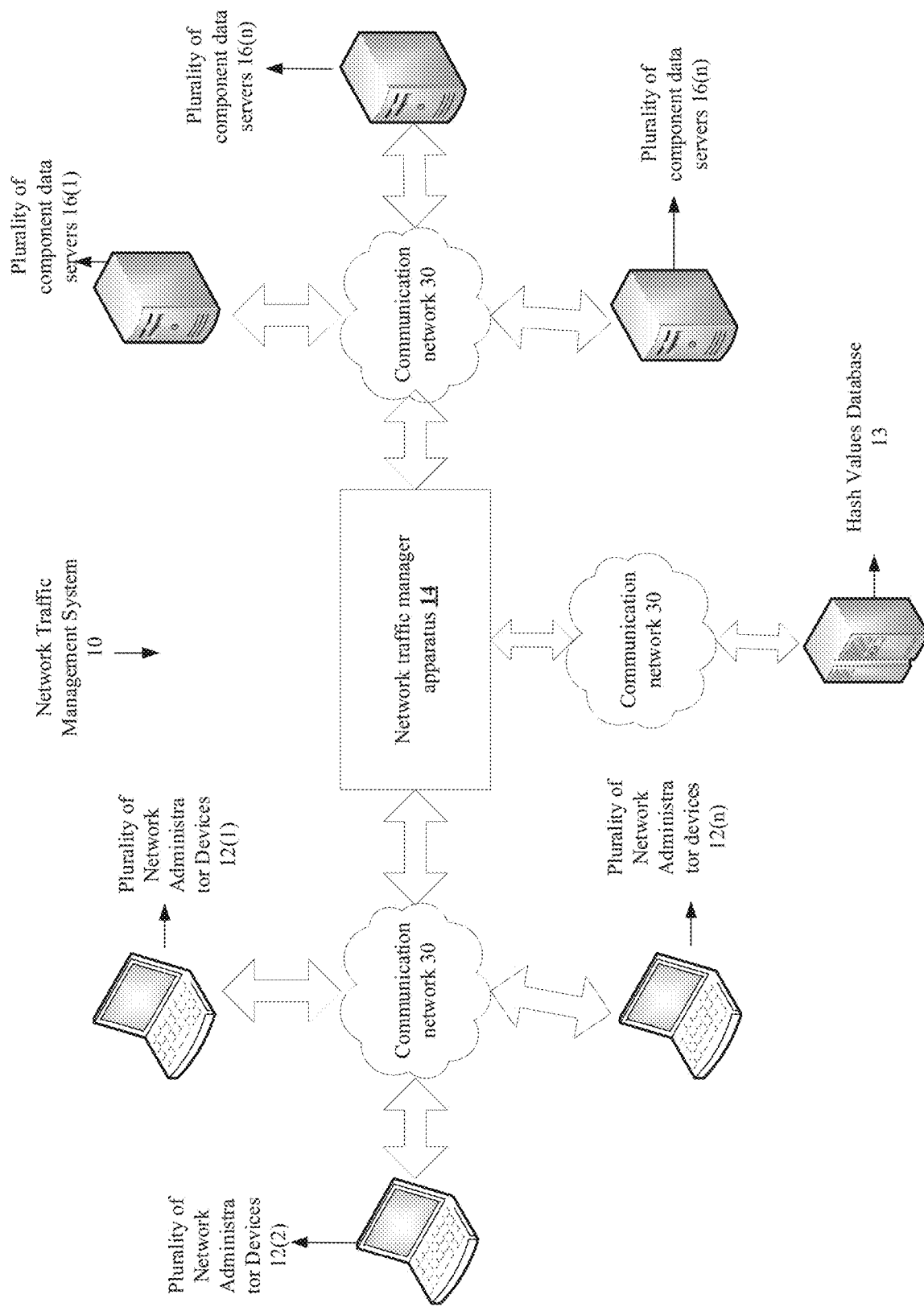
FIG. 1 is a block diagram of a network environment including an example of a network traffic manager apparatus for detecting changes to firmware, software, and software configurations.
Figure 2:
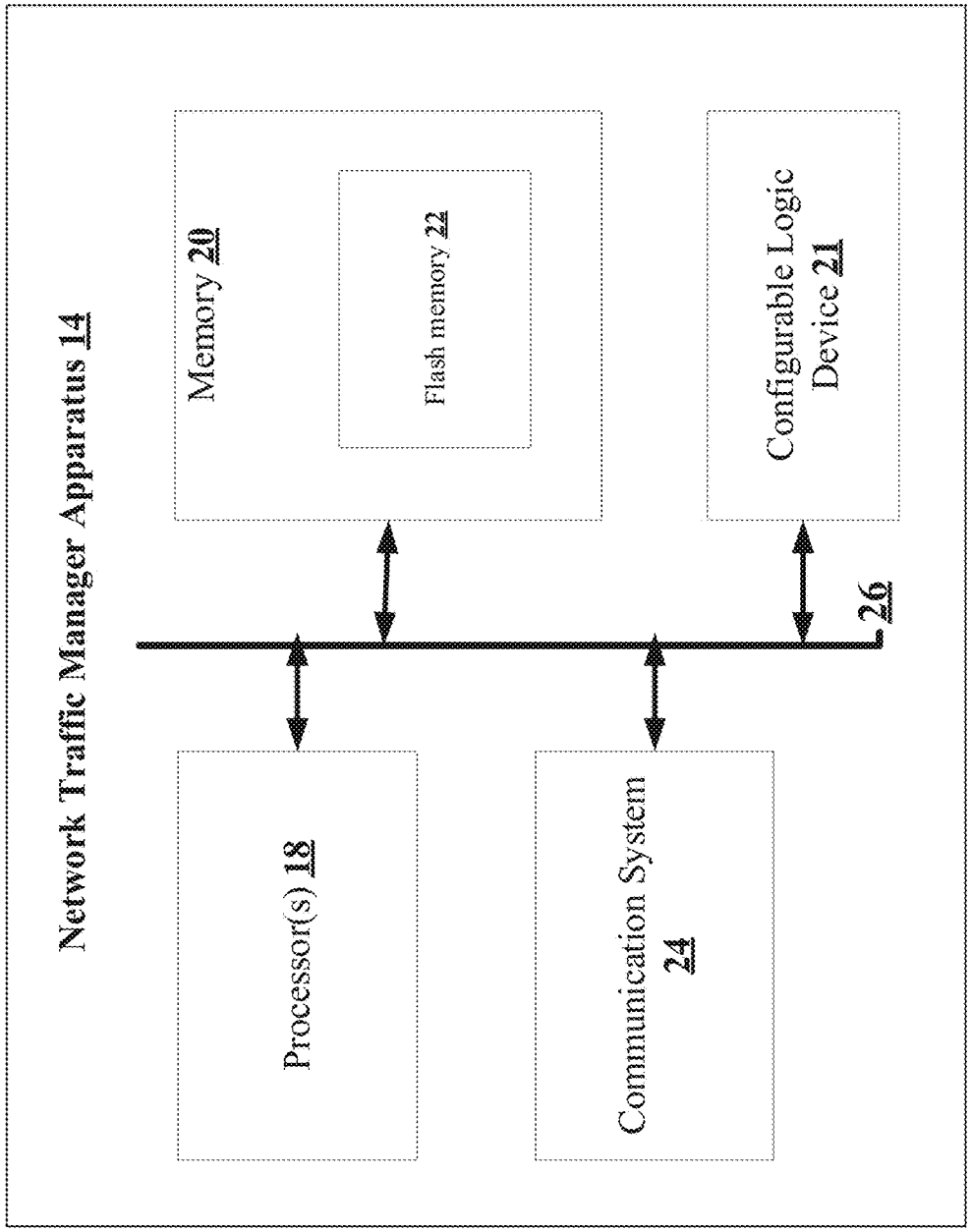
FIG. 2 is an exemplary block diagram of the network traffic manager apparatus.

An example of a network environment 10 which incorporates a network traffic management system for detecting changes to a firmware with the network traffic manager apparatus 14 is illustrated in FIGS. 1 and 2. The exemplary environment 10 includes a plurality of network administrator devices 12(1)-12(n), a hash value database 13, network traffic manager apparatus 14, and a plurality of component data servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including detecting changes to firmware, software, and its configuration.

Referring more specifically to FIGS. 1 and 2, the network traffic manager apparatus 14 of the network traffic management system is coupled to the plurality of network administrator devices 12(1)-12(n) through the communication network 30, although the plurality of network administrator devices 12(1)-12(n) and network traffic manager apparatus 14 may be coupled together via other topologies. Additionally, the network traffic manager apparatus 14 is coupled to the plurality of component data servers 16(1)-16(n) through the communication network 30, although the servers 16(1)-16(n) and the network traffic manager apparatus 14 may be coupled together via other topologies.

The network traffic manager apparatus 14 assists with detecting changes to firmware as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The processor 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
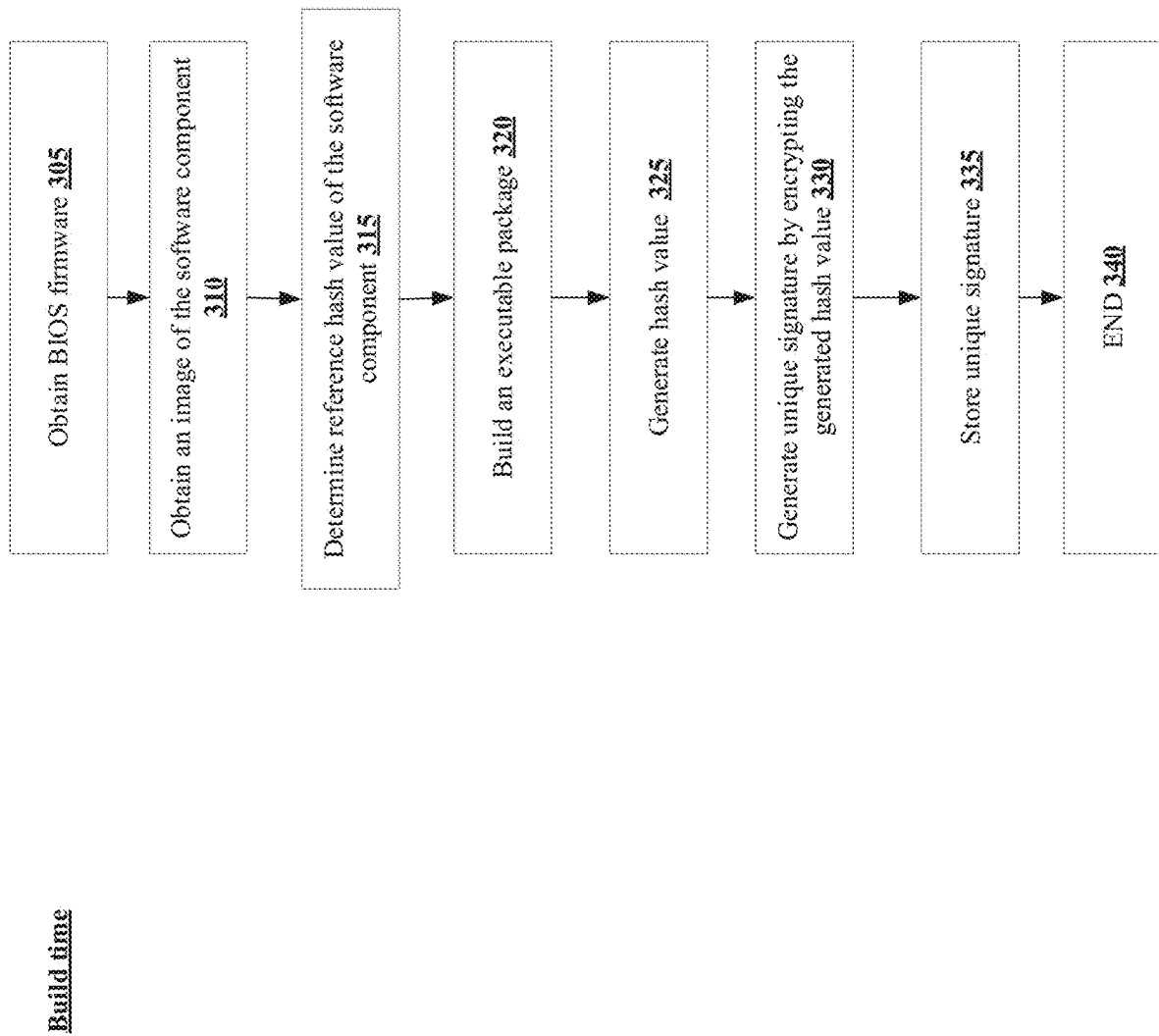
FIG. 3 is an exemplary flowchart of a method for generating a hash value to detect the changes to the firmware and the software components.
Figure 4:
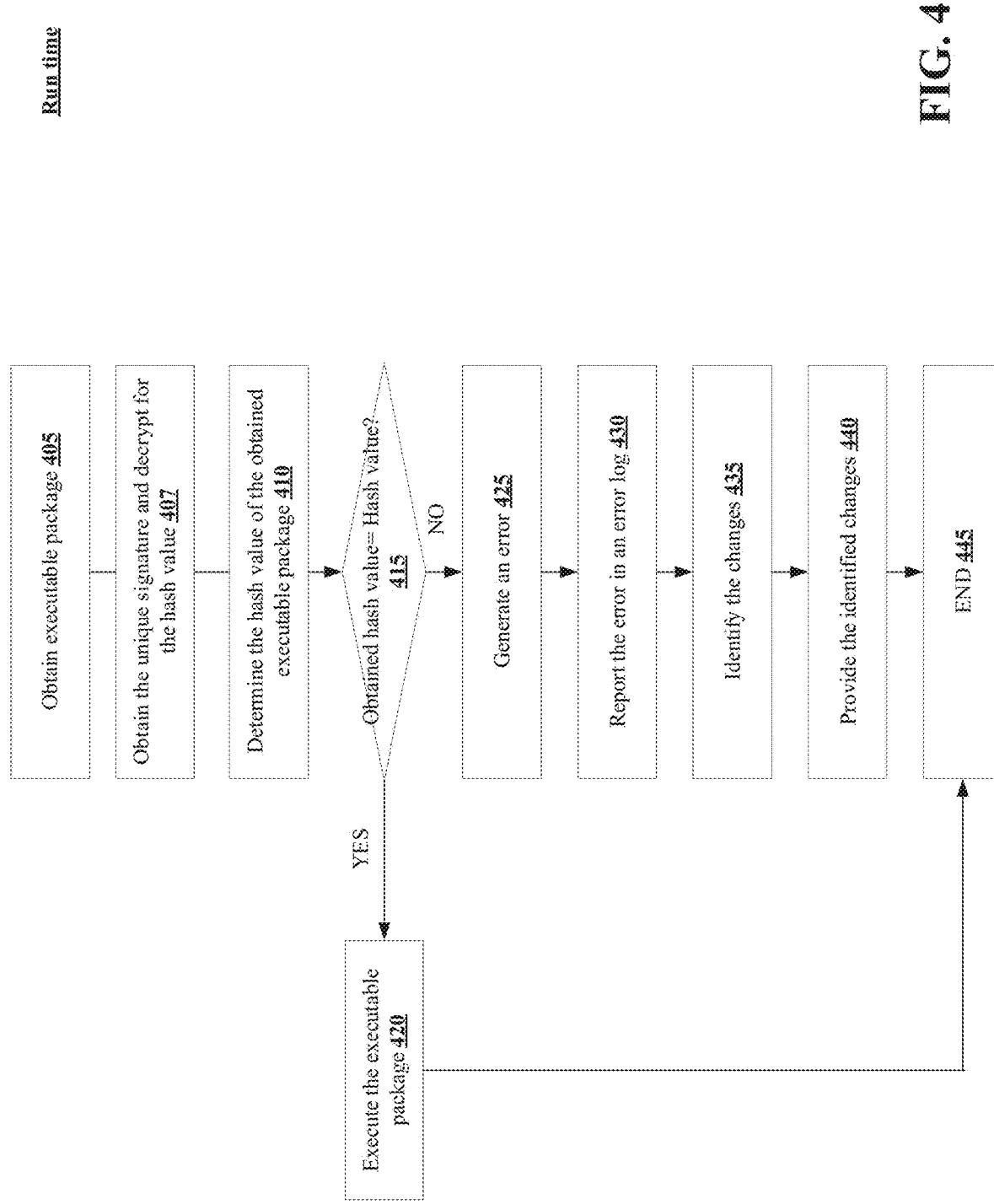
FIG. 4 is an exemplary flowchart of a method for detecting changes to the firmware and software components using the generated hash value.

The memory 20 within the network traffic manager apparatus 14 may comprise one or more tangible storage media, such as RAM, ROM, flash memory 22, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowcharts shown in FIGS. 3-4 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIG. 3. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic manager apparatus 14 is used to operatively couple and communicate between the network traffic manager apparatus 14, the plurality of network administrator devices 12(1)-12(n), the hash values database 13, and the plurality of component data servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of network administrator devices 12(1)-12(n) of the network traffic management system 10, include a central processing unit (CPU) or processor, a memory, input/display device interface, configurable logic device and an input/output system or I/O system, which are coupled together by a bus or other link. The plurality of network administrator devices 12(1)-12(n), in this example, may run interface applications, such as Web browsers, that may provide an interface to make requests for and send and/or receive data to and/or from the network traffic manager apparatus 14. Additionally, the plurality of network administrator devices 12(1)-12(n) can include any type of computing device that can receive, render, and facilitate user interaction, such as client computers, network computer, mobile computers, mobile phones, virtual machines (including cloud-based computer), or the like. Each of the plurality of network administrator devices 12(1)-12(n) utilizes the network traffic manager apparatus 14 to conduct one or more operations such as to obtain data associated with the firmware and/or software components, by way of example only, although other numbers and/or types of systems could be utilizing these resources and other types and numbers of functions utilizing other types of protocols could be performed.

Additionally in this example, the hash value database 13 of the network traffic management system 10, include a central processing unit (CPU) or processor, a memory, configurable logic device and an input/output system or I/O system, which are coupled together by a bus or other link. In this example, the hash value database 13 securely stores hash values encrypted for each hardware component within the network traffic manager apparatus 14, although the hash value database 13 can include other types or amounts of information. The hash value database 13, in this example, may run interface applications, to make requests for and send and/or receive data to and/or from the network traffic manager apparatus 14. Additionally, the hash value database 13 can include any type of computing device that can receive, render, and facilitate user interaction, such as client computers, network computer, mobile computers, mobile phones, virtual machines (including cloud-based computer), or the like.

Each of the plurality of component data servers 16(1)-16(n) of the network traffic management system include a central processing unit (CPU) or processor, a memory, and a communication system, which are coupled together by a bus or other link, although other numbers and/or types of network devices could be used. Generally, the plurality of component data servers 16(1)-16(n) provides data associated with the hardware components present within the network traffic manager apparatus 14 via the communication network 30 according to the HTTP-based application RFC protocol or the CIFS or NFS protocol in this example, but the principles discussed herein are not limited to this example and can include other application protocols. A series of applications may run on the plurality component data servers 16(1)-16(n) that allows the transmission of applications requested by the plurality of network administrator devices 12(1)-12(n), or the network traffic manager apparatus 14. The plurality of component data servers 16(1)-16(n) may provide data or receive data in response to requests directed toward the respective applications on the plurality of component data servers 16(1)-16(n) from the plurality of network administrator devices 12(1)-12(n), or the network traffic manager apparatus 14. It is to be understood that the plurality of component data servers 16(1)-16(n) may be hardware or software or may represent a system with multiple external resource servers, which may include internal or external networks. In this example the plurality of component data servers 16(1)-16(n) may be any version of Microsoft® IIS servers or Apache® servers, although other types of servers may be used.

Although the plurality of component data servers 16(1)-16(n), are illustrated as single servers, each of the plurality of component data servers 16(1)-16(n) may be distributed across one or more distinct network computing devices. Moreover, the plurality of component data servers 16(1)-16(n) are not limited to a particular configuration. Thus, the plurality of plurality component data servers 16(1)-16(n) may contain a plurality of network computing devices that operate using a master/slave approach, whereby one of the network computing devices of the plurality of component data servers 16(1)-16(n) operate to manage and/or otherwise coordinate operations of the other network computing devices. The plurality of component data servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the hash value database 13, one or more of the plurality of component data servers 16(1)-16(n) depicted in FIG. 1 can operate within network traffic manager apparatus 14 rather than as a stand-alone server communicating with network traffic manager apparatus 14 via the communication network(s) 30. In another example, the hash value database 13, one or more of the plurality of component data servers 16(1)-16(n) may operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the plurality of component data servers 16(1)-16(n) or, the network traffic manager apparatus 14, the hash value database 13, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of network administrator devices 12(1)-12(n), the hash value database 13, the network traffic manager apparatus 14, and the plurality of component data servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of network administrator devices 12(1)-12(n), the hash value database 13, the plurality of component data servers 16(1)-16(n), for example, may be configured to operate as virtual instances on the same physical machine. In other words, one or more of network traffic manager apparatus 14, the plurality of network administrator devices 12(1)-12(n), the hash value database 13, or the plurality of component data servers 16(1)-16(n) illustrated in FIG. 1 may operate on the same physical device rather than as separate devices communicating through a network as depicted in FIG. 1. There may be more or fewer plurality of network administrator devices 12(1)-12(n), the hash value database 13, network traffic manager apparatus 14, or the plurality of component data servers 16(1)-16(n) than depicted in FIG. 1. The plurality of network administrator devices 12(1)-12(n), the hash value database 13, and the plurality of component data servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

Figure 5:
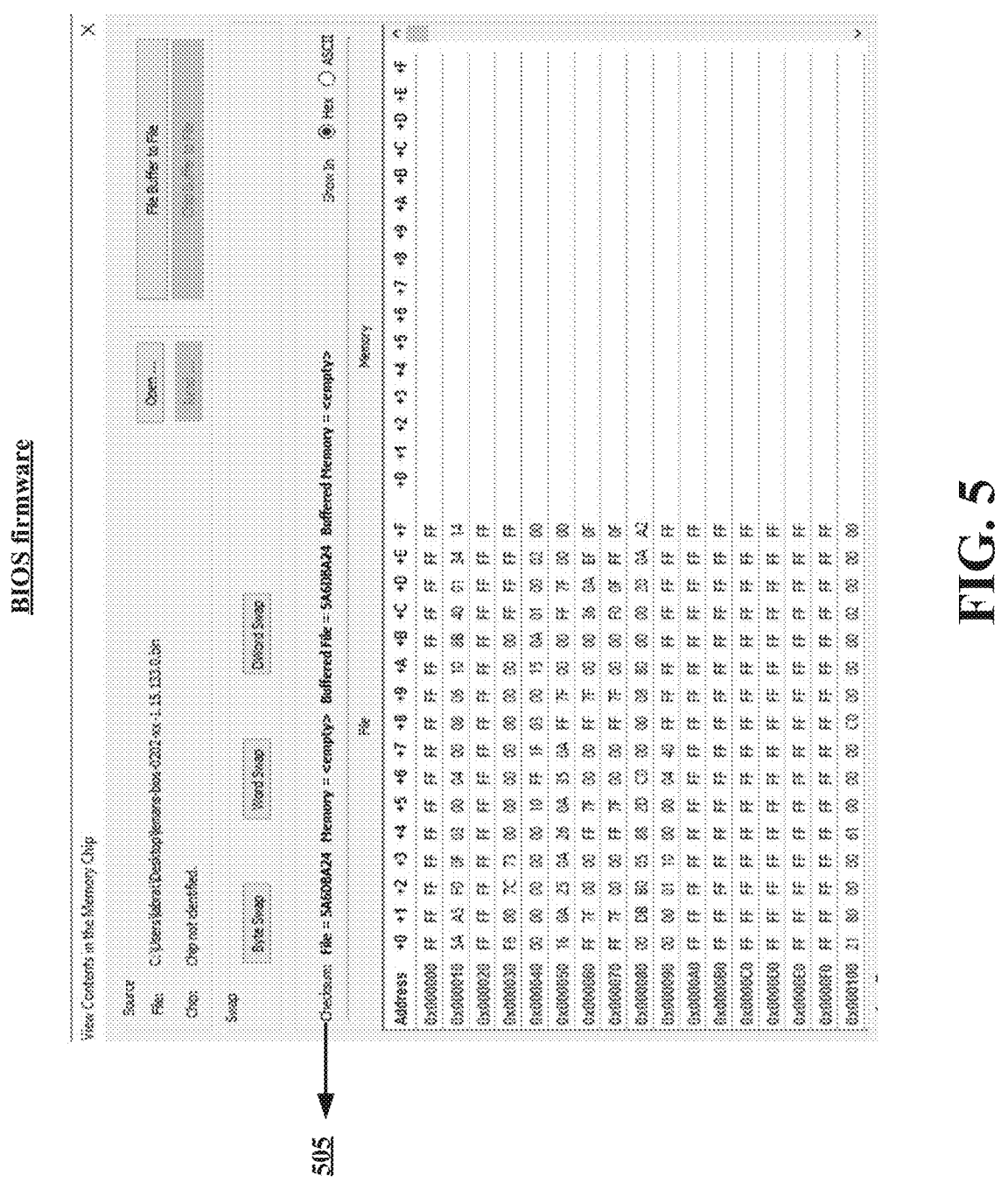

An example of a method for detecting changes to a firmware will now be described with reference to FIGS. 1-7. In particular, an example of a method for detecting any changes to any firmware or software components will now be illustrated with reference to FIG. 3. In step 305, the network traffic manager apparatus 14 obtains a basic input/output system (BIOS) firmware associated with a hardware component from one of the plurality of component data servers 16(1)-16(n) using a unique identification number associated with the hardware component, although the BIOS firmware can be obtained from other memory locations using other techniques. As it would be appreciated by a person having ordinary skill in the art, BIOS is a firmware used to perform hardware initialization during the booting process (power-on startup), and to provide runtime services for operating systems and programs. In this example, the hardware component includes a unique identification number and the network traffic manager apparatus 14 uses the unique identification number to obtain the corresponding the BIOS firmware from one of the plurality of component data servers 16(1)-16(n), although other techniques can be used to obtain the BIOS firmware, Additionally, in this example, the obtained BIOS firmware includes a reference hash value associated with the BIOS firmware that was created at the time of manufacture, although the BIOS image can include other types or amounts of information. By way of example, FIG. 5 illustrates an exemplary BIOS firmware including a reference hash value 505 associated with a hardware component of the network traffic manager apparatus 14. Further in this example, the step of obtaining the BIOS firmware is performed at build time which relates to the time at which the hardware component is being assembled. Even further in this example, if there is more than one version of the BIOS firmware associated with the hardware component, the network traffic manager apparatus 14 obtains all versions of the BIOS firmware from one of the plurality of component data servers 16(1)-16(n), although different versions of the BIOS firmware can be obtained from different locations.

In step 310, the network traffic manager apparatus 14 obtains each software component associated with the hardware component for which the BIOS firmware was obtained in step 305, from one of the plurality of component data servers 16(1)-16(n) based on the unique identification number associated with the hardware component, although the software component can be obtained from other memory locations or in other manners. As it would be appreciated by a person having ordinary skill in the art, the software component may for example include a kernel and bootloader that assists with the execution of the software programs present within the software component, although the software component can include other types or amounts of information. Further in this example, if there are multiple versions of the software component associated with the hardware component, then the network traffic manager apparatus 14 can obtain the different versions of the software components from one of the plurality of components data servers 16(1)-16(n).

In step 315, the network traffic manager apparatus 14 determines a reference hash value for the obtained software component by applying a hashing algorithm on the software component, although the network traffic manager apparatus 14 can use other techniques to determine the reference hash value. In this example, the reference hash value can be used to detect errors that may be introduced during the transmission or storage of the software programs within the software component and/or deliberate changes to the software component and the BIOS firmware to compromise the hardware component. Further in this example, when there are multiple versions of the software component present, then the network traffic manager apparatus 14 determines a reference hash value for each version of the software component.

Figure 6:
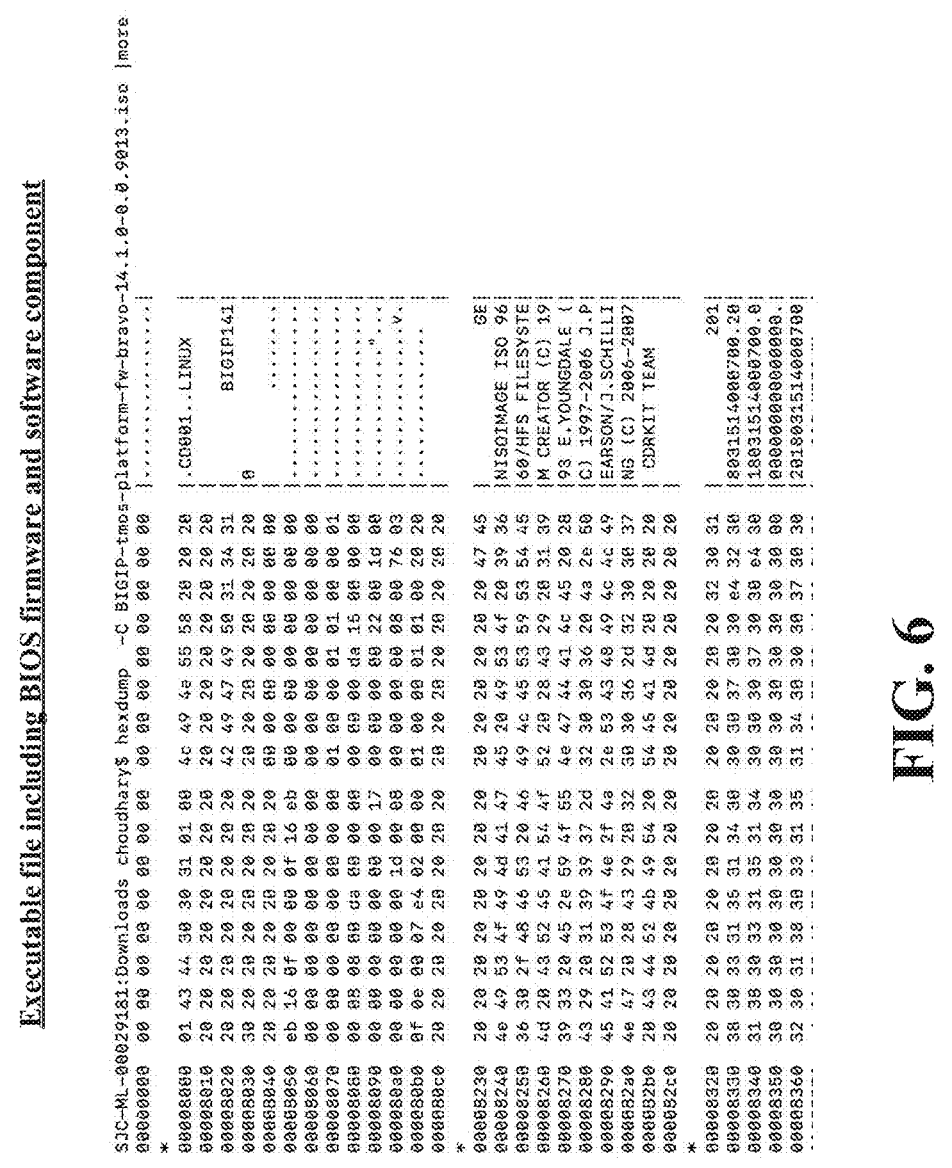

In step 320, the network traffic manager apparatus 14 builds an executable package including the aggregation of the obtained BIOS firmware and the obtained software component, although the executable package can include other types or amounts of information. As it would be appreciated by a person having ordinary skill in the art, the executable package when executed at run time results in the functioning of the hardware component. In this example, the executable package includes a file comprising the BIOS firmware and the software component in a hexadecimal format, although the executable package can include other types or amounts of information in other formats. An example of the executable package including the BIOS firmware and the software component that is built in hexadecimal format is illustrated in FIG. 6. Additionally in this example, when there are multiple versions of the BIOS firmware and the software component, then the network traffic manager apparatus 14 builds an executable package for a combination of each version of the BIOS firmware and the software component. Further in this example, the network traffic manager apparatus 14 stores the executable package in the memory of the hardware component, although the executable package can be stored at other memory locations.

In step 325, the network traffic manager apparatus 14 generate a hash value for executable package by applying a hashing algorithm to the file associated with the executable package, although other techniques can be used to generate final hash value. Alternatively, the network traffic manager apparatus 14 can generate the final hash value using the reference hash values of the obtained BIOS firmware and the software components. Additionally in this example, when there are multiple versions of the BIOS firmware and the software component, the network traffic manager apparatus 14 generates a hash value for the executable package with different versions of the BIOS firmware and the software component by applying the hashing algorithm to the corresponding file associated with the executable package.

In step 330, the network traffic manager apparatus 14 encrypts the generated hash value to generate a unique signature, although the network traffic manager apparatus 14 can use other techniques to generate a unique signature. Additionally in this example, the network traffic manager apparatus 14 also includes a time stamp on the generated final hash value. Further in this example, when there are multiple versions of the BIOS firmware and the software component that results in multiple hash values, the network traffic manager apparatus 14 encrypts each of the generated value separately to generate multiple unique signatures. By way of example, the network traffic manager apparatus 14 can use a secure hash 256 (or SH256) algorithm for encryption, although other types of encryption algorithms can be used. An illustration of encrypting multiple hash values using SH256 algorithm is represented in FIG. 7, by way of example.

In step 335, the network traffic manager apparatus 14 stores the generated unique signature associated with the hardware component within the hash value database 13, although the generated unique signature can be stored at other memory locations and the exemplary method ends at step 340. Additionally in this example, the network traffic manager apparatus 14 stores the unique identification number associated with the hardware component along with the generated unique signature so that the generated unique signature can be easily identified based on the unique identification number for further reference. Further in this example, when there are multiple unique signatures generated in step 330, the network traffic manager apparatus 14 stores all the unique signatures associated with the hardware component and the corresponding unique identification number in the hash value database 13.

An example of a method for detecting changes to any firmware or software components at run time using the set of one or more hash values will now be illustrated with reference to FIG. 4. In step 405, the network traffic manager apparatus 14 obtains the executable package of the one or more hardware components from the memory of the hardware component, although the executable package can be obtained from other memory locations.

In step 407, the network traffic manager apparatus 14 obtains the unique signature associated with each hardware component from the hash value database 13 using the unique identification number associated with each hardware component, although the encrypted set of hash values can be obtained from other memory locations using other parameters. In this example, when there are multiple unique signatures associated with each hardware component, then the network traffic manager apparatus 14 obtains all unique signatures from the hash value database 13. Optionally, the network traffic manager apparatus 14 can send the obtained unique signatures to remote server securely for verification. Further, upon obtaining the unique signature, the network traffic manager apparatus 14 decrypts obtained unique signature(s) using a decryption algorithm corresponding to the encryption algorithm that was used in step 330 of FIG. 3. In this example, decrypting the unique signature would result deriving the hash value that was generated in step 325. Further, when there is more than one unique signature associated with the hardware component, the network traffic manager apparatus 14 decrypts all the unique signatures using the decryption algorithm to derive the corresponding hash values.

In step 410, the network traffic manager apparatus 14 determines the hash value of the executable package obtained in step 405 by using the technique illustrated above in step 325, although other techniques can be used to determine the hash value.

In step 415, the network traffic manager apparatus 14 compares the hash value determined in step 410 with the hash value that was derived from the unique signature in step 407 to determine if there is an exact match, although other types of comparisons may be performed. In this example, when the encrypted final hash value derived from the unique signature in step 407 is not an exact match with the hash value of the executable package determined in step 410, then the network traffic manager apparatus 14 determines that the executable package (including the BIOS firmware and the software components) has been modified. Additionally in this example, when there are multiple hash values derived from multiple signatures in step 407, then the network traffic manager apparatus 14 compares the hash value determined in step 410 with each of the derived hash value to determine if there is an exact match with at least one of the hash values. By way of example, the executable package can be modified when a third party unauthorized software such as malware or spyware has been included and complied into the executable package. Alternatively, the executable package can also be modified by changing the parameter of the firmware and/or deleting the software components. Accordingly, when additional software has been added, the hash value of the executable package would be different to the hash value that was determined and stored at build time. When the network traffic manager apparatus 14 determines that the hash value derived from the unique signature in step 407 is an exact match to the hash value determined in step 410 at run time, then the Yes branch is taken to step 420. In step 420, the network traffic manager apparatus 14 executes the executable package and this exemplary method ends at step 445.

However, if back in step 415 the network traffic manager apparatus 14 determines that the hash value determined in step 410 is not an exact match to at least one of the hash values derived from the unique signature in step 407, then the No branch is taken to step 425. In step 425, the network traffic manager apparatus 14 determines that executable package has been modified with third party software and generates an error message without executing the executable package.

In step 430, the network traffic manager apparatus 14 reports the generated error message into an error log, although the error message may be processed in other manners, such as sending an electronic communication with an alert or executing a network security action by way of example only. By way of a further example, the report in the error log can include the determined hash value of the executable package, the derived hash value, although the error log can include other types or amounts of information.

In step 435, the network traffic manager apparatus 14 identifies the third party software that has been added to the executable package or the modification to the BIOS firmware by comparing the determined hash value and the hash value derived in step 407, although other techniques can be used identify the modification to the BIOS firmware and/or the software components.

Next in step 440, the network traffic manager apparatus 14 provides the identified changes to the plurality of network administrator devices 12(1)-12(n) and this exemplary method ends at step 445. In addition to providing the identified changes to the plurality of network administrator devices 12(1)-12(n), the network traffic manager apparatus 14 can also disable the functioning of the hardware component temporarily and the exemplary method ends at step 445.

Accordingly, this technology provides methods, non-transitory computer readable medium, and apparatuses that assist with detecting changes to a firmware and software components associated with a hardware component. By using the techniques illustrated below, the disclosed technology is able to solve the technological problem illustrated above in the background section by detect malware that is incorporated into a hardware device at the time of manufacturing. Using the techniques illustrated below, the disclosed technology is able to compare the firmware and/or software of a hardware device that was installed at the time of manufacturing and at the time of execution. Only when the firmware and/or software of a hardware device that was installed at the time of manufacturing matches exactly with the firmware and/or software at the time of execution, the disclosed technology assists with booting the hardware component.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method implemented by a network traffic management system comprising one or more network traffic apparatuses, client devices, or server devices, the method comprising:
    obtaining an executable file comprising a basic input-output system firmware and software component data of a hardware component at run-time;
    identifying a hash value for the obtained executable file at the run-time, wherein the identifying the hash value for the obtained executable file at the run-time further comprises, applying a hashing algorithm on the obtained executable file to identify the hash value;
    comparing the identified hash value with a stored hash value associated with the obtained executable file to determine when the obtained executable file is unmodified, wherein the stored hash value was determined at a build time of the hardware component; and
    executing the obtained executable file of the hardware component when the obtained executable file is determined to be unmodified.

2. The method as set forth in claim 1 wherein the determining the stored hash value at build time of the hardware component further comprises, generating a build time executable file by aggregating a basic input-output system firmware and build time software component data associated with the hardware component.

3. The method as set forth in claim 2 further comprising, generating the stored hash value at build time by applying a hashing algorithm on the generated build time executable file.

4. The method as set forth in claim 1 wherein the comparing further comprises:
    identifying a unique signature associated with the obtained executable file by using a unique identification number associated with the hardware component; and
    decrypting the identified unique signature to derive the stored hash value.

5. A non-transitory computer readable medium having stored thereon instructions comprising executable code which when executed by one or more processors, causes the processors to:
    obtain an executable file comprising a basic input-output system firmware and software component data of a hardware component at run-time;
    identify a hash value for the obtained executable file at the run-time, wherein identifying the hash value for the obtained executable file at the run-time further comprises, applying a hashing algorithm on the obtained executable file to identify the hash value;
    compare the identified hash value with a stored hash value associated with the obtained executable file to determine when the obtained executable file is unmodified, wherein the stored hash value was determined at a build time of the hardware component; and
    execute the obtained executable file of the hardware component when the obtained executable file is determined to be unmodified.

6. The non-transitory computer readable medium as set forth in claim 5 wherein the determining the stored hash value at build time of the hardware component further comprises, generating a build time executable file by aggregating a basic input-output system firmware and build time software component data associated with the hardware component.

7. The non-transitory computer readable medium as set forth in claim 6 further comprising, generating the stored hash value at build time by applying a hashing algorithm on the generated build time executable file.

8. The non-transitory computer readable medium as set forth in claim 5 wherein the comparing further comprises:
identifying a unique signature associated with the obtained executable file by using a unique identification number associated with the hardware component; and
decrypting the identified unique signature to derive the stored hash value.

9. A network traffic manager apparatus, comprising memory comprising programmed instructions stored in the memory and one or more processors configured to be capable of executing the programmed instructions stored in the memory to:
obtain an executable file comprising a basic input-output system firmware and software component data of a hardware component at run-time;
identify a hash value for the obtained executable file at the run-time, wherein identifying the hash value for the obtained executable file at the run-time further comprises, applying a hashing algorithm on the obtained executable file to identify the hash value;
compare the identified hash value with a stored hash value associated with the obtained executable file to determine when the obtained executable file is unmodified, wherein the stored hash value was determined at a build time of the hardware component; and
execute the obtained executable file of the hardware component when the obtained executable file is determined to be unmodified.

10. The apparatus as set forth in claim 9 wherein the one or more processors are further configured to be capable of executing the programmed instructions stored in the memory wherein the determining the stored hash value at build time of the hardware component further comprises, generating a build time executable file by aggregating a basic input-output system firmware and build time software component data associated with the hardware component.

11. The apparatus as set forth in claim 10 wherein the one or more processors are further configured to be capable of executing the programmed instructions stored in the memory to generate the stored hash value at build time by applying a hashing algorithm on the generated build time executable file.

12. The apparatus as set forth in claim 9, wherein the one or more processors are further configured to be capable of executing the programmed instructions stored in the memory wherein the comparing further comprises:
identifying a unique signature associated with the obtained executable file by using a unique identification number associated with the hardware component; and
decrypting the identified unique signature to derive the stored hash value.

13. A network traffic management system, comprising one or more traffic management apparatuses, client devices, or server devices, the network traffic management system comprising memory comprising programmed instructions stored thereon and one or more processors configured to be capable of executing the stored programmed instructions to:
obtain an executable file comprising a basic input-output system firmware and software component data of a hardware component at run-time;
identify a hash value for the obtained executable file at the run-time, wherein identifying the hash value for the obtained executable file at the run-time further comprises, applying a hashing algorithm on the obtained executable file to identify the hash value;
compare the identified hash value with a stored hash value associated with the obtained executable file to determine when the obtained executable file is unmodified, wherein the stored hash value was determined at a build time of the hardware component; and
execute the obtained executable file of the hardware component when the obtained executable file is determined to be unmodified.

14. The network traffic management system as set forth in claim 13 wherein the one or more processors are further configured to be capable of executing the programmed instructions stored in the memory wherein the determining the stored hash value at build time of the hardware component further comprises, generating a build time executable file by aggregating a basic input-output system firmware and build time software component data associated with the hardware component.

15. The network traffic management system as set forth in claim 14 wherein the one or more processors are further configured to be capable of executing the programmed instructions stored in the memory to generate the stored hash value at build time by applying a hashing algorithm on the generated build time executable file.

16. The network traffic management system as set forth in claim 13 wherein the one or more processors are further configured to be capable of executing the programmed instructions stored in the memory wherein the comparing further comprises:
identifying a unique signature associated with the obtained executable file by using a unique identification number associated with the hardware component; and
decrypting the identified unique signature to derive the stored hash value.

* * * * *